US012573056B2

(12) United States Patent
Moskalev et al.

(10) Patent No.: US 12,573,056 B2
(45) Date of Patent: Mar. 10, 2026

(54) DEVICE AND COMPUTER-IMPLEMENTED METHOD FOR OBJECT TRACKING

(71) Applicant: Robert Bosch GmbH, Stuttgart (DE)

(72) Inventors: Artem Moskalev, Amsterdam (NL);
Arnold Smeulders, Amsterdam (NL);
Volker Fischer, Renningen (DE)

(73) Assignee: ROBERT BOSCH GMBH, Stuttgart
(DE)

( * ) Notice: Subject to any disclaimer, the term of this
patent is extended or adjusted under 35
U.S.C. 154(b) by 642 days.

(21) Appl. No.: 17/873,131

(22) Filed: Jul. 25, 2022

(65) Prior Publication Data

US 2023/0051014 A1     Feb. 16, 2023

(30) Foreign Application Priority Data

Aug. 11, 2021    (EP) ..................................... 21190776

(51) Int. Cl.
| | |
|---|---|
| *G06T 7/246* | (2017.01) |
| *G06V 10/774* | (2022.01) |
| *G06V 10/86* | (2022.01) |

(52) U.S. Cl.
CPC ........... *G06T 7/246* (2017.01); *G06V 10/774*
(2022.01); *G06V 10/86* (2022.01); *G06T*
*2207/10016* (2013.01); *G06T 2207/30241*
(2013.01)

(58) Field of Classification Search
CPC ................ G06F 16/284; G06V 10/774; G06T
2207/20072; G06T 2207/20076; G06T
2207/20081; G06T 2207/20084; G06T
2207/30232; G06T 2207/30252; G06T
7/20
See application file for complete search history.

(56) References Cited

U.S. PATENT DOCUMENTS 11,620,517 B2 *   4/2023   Satorras ................... G06N 3/08
706/25
2021/0125344 A1   4/2021   Zhang et al.

OTHER PUBLICATIONS

Tang et al., "Mutli-Person Tracking by Multicut and Deep Match-
ing," ECCV 2016 Workshops, Part II, LNCS 9914, 2016, pp.
100-111.
Wang et al., "An Online Multiple Object Tracker Based on Structure
Keeper Net," Applied Intelligence, vol. 51, 2021, pp. 8010-8029.

(Continued)

*Primary Examiner* — Diane D Mizrahi
(74) *Attorney, Agent, or Firm* — NORTON ROSE
FULBRIGHT US LLP

(57) ABSTRACT

A device and computer-implemented method for object
tracking. The method comprises providing a sequence of
digital images, determining a sequence of relational graph
embeddings, wherein a first relational graph embedding of
the sequence comprises a first object embedding represent-
ing a first object in a first digital image of the sequence of
digital images, wherein the first relational graph embedding
comprises a first relation embedding of a relation for the first
object embedding, wherein the first relation embedding
relates the first object embedding to embeddings represent-
ing other objects of the first digital image in the first
relational graph embedding and to embeddings in a second
relational graph embedding of the sequence that represent
objects of a second digital image of the sequence of digital
images.

15 Claims, 5 Drawing Sheets

(56) References Cited

OTHER PUBLICATIONS

Ma et al., "Deep Human-Interaction and Association by Graph-Based Learning for Multiple Object Tracking in the Wild," International Journal of Computer Vision, vol. 129, 2021, pp. 1993-2010.

Bergmann et al., "Tracking Without Bells and Whistles," IEEE/CVF International Conference on Computer Vision (ICCV), 2019, pp. 941-951.

* cited by examiner

Fig. 2

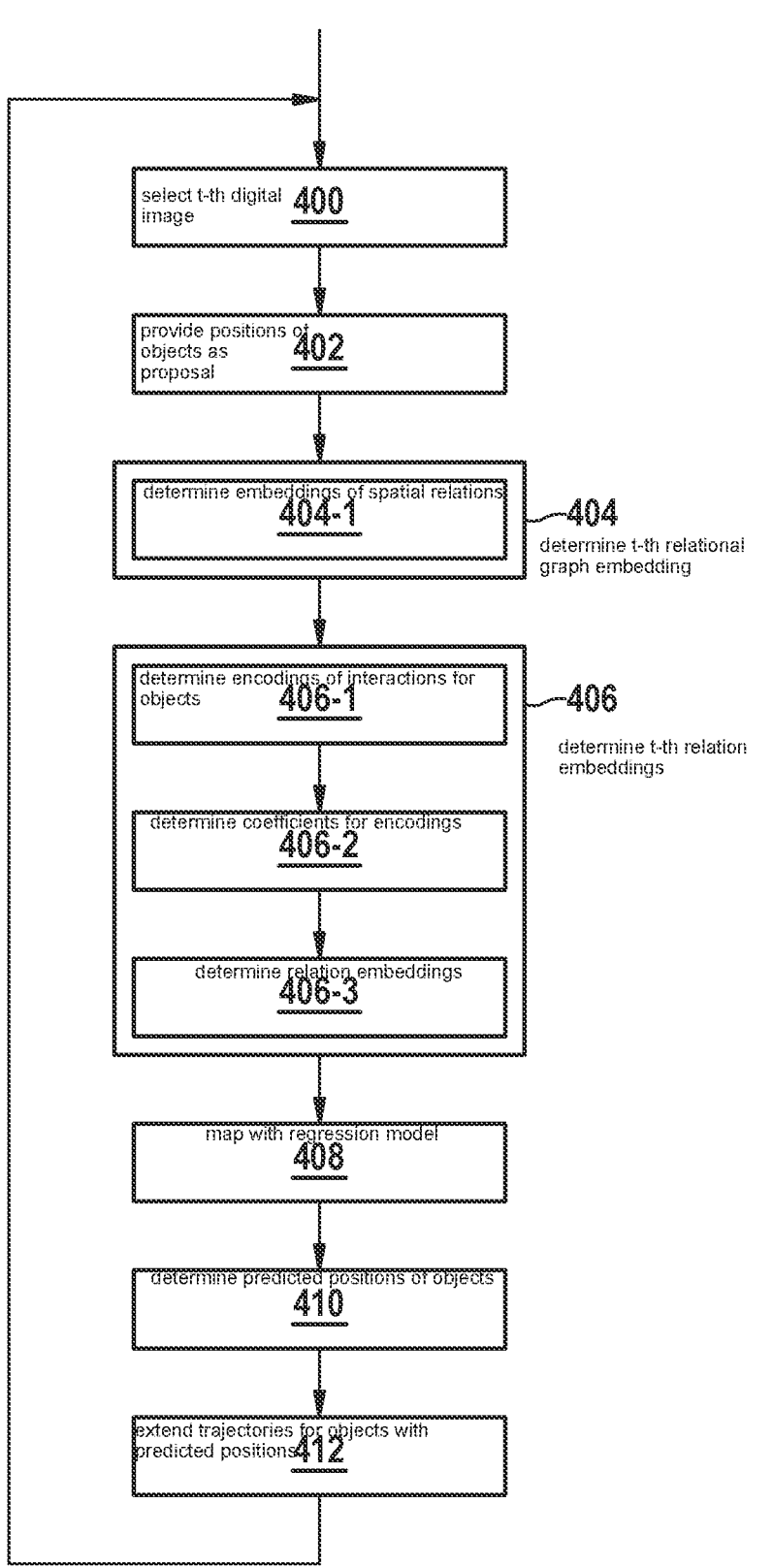

select t-th digital image 400 provide positions of objects as proposal 402 determine embeddings of spatial relations 404-1

404 determine t-th relational graph embedding determine encodings of interactions for objects 406-1

406 determine t-th relation embeddings determine coefficients for encodings 406-2 determine relation embeddings 406-3 map with regression model 408 determine predicted positions of objects 410 extend trajectories for objects with predicted positions 412

Fig. 4 sample sequence of digital images
502 determine predicted positions of objects
504 determine loss function
506 run backpropagation to update
parameters          508

DEVICE AND COMPUTER-IMPLEMENTED METHOD FOR OBJECT TRACKING

CROSS REFERENCE

The present application claims the benefit under 35 U.S.C. § 119 of European Patent Application No. EP 21 19 0776.1 filed on Aug. 11, 2021, which is expressly incorporated herein by reference in its entirety.

FIELD

The present invention relates to a device and a computer-implemented method for object tracking, in particular tracking vehicles or pedestrians for surveillance or autonomous driving.

BACKGROUND INFORMATION

Tracking-by-regression is a multi-object tracking approach, where an association of objects is performed by utilizing a regression head of an object detector. Philipp Bergmann, Tim Meinhardt, and Laura Leal-Taixé, "Tracking without bells and whistles," available at https://arxiv.org/abs/1903.05625, describes aspects of tracking-by-regression.

SUMMARY

A device and computer-implemented method according to the present invention have the ability to take complex dynamics of multiple objects into account.

In accordance with an example embodiment of the present invention, the computer-implemented method for object tracking comprises providing a sequence of digital images, determining a sequence of relational graph embeddings, wherein a first relational graph embedding of the sequence comprises a first object embedding representing a first object in a first digital image of the sequence of digital images, wherein the first relational graph embedding comprises a first relation embedding of a relation for the first object embedding, wherein the first relation embedding relates the first object embedding to embeddings representing other objects of the first digital image in the first relational graph embedding and to embeddings in a second relational graph embedding of the sequence that represent objects of a second digital image of the sequence of digital images. Thus, a spatial-temporal relation is extracted from the digital images and stored in a relational graph embedding. The relational graph embedding provides a data basis for significantly improving a prediction of a position of objects.

In accordance with an example embodiment of the present invention, the method may comprise mapping the first relational graph embedding and a position of the first object in the second digital image with a regression model to an output indicative of a predicted position of the first object in the first digital image or a change of the position for a predicted position of the first object in the first digital image. The output may be the position of a tracked object, or the change of the position between two digital images that were captured at different time steps. Using the relational graph embedding improves the prediction of the position.

The method may comprise providing a position of the first object in the second digital image, determining the predicted position of the first object in the first digital image depending on the position of the first object in the second digital image and the output indicative of the change of the position.

Providing the position of the object in the second digital image improves the prediction of the position in the first digital image further.

The method may comprise reading a first trajectory for the first object from the at least one memory, determining the predicted position of the first object depending on the first trajectory, determining a second trajectory depending on the predicted position of the first object. Thus, the second trajectory is a continuation of the first trajectory that is based on the improved prediction of the position.

The method may comprise receiving the sequence of digital images, in particular from a sensor, determining a control signal for a technical system, in particular a robot, a machine, or a vehicle, depending on the predicted position or a trajectory comprising the predicted position. Thus, an autonomous behavior of the technical system is improved based on the improved prediction of the position of objects in the digital images.

The method may comprise determining the first relation embedding wherein determining the first relation embedding comprises determining an embedding of a spatial relation for the first object embedding, wherein the spatial relation relates the first object embedding to a set of object embeddings representing other objects of the first digital image in the first relational graph embedding, and determining the first relation embedding depending on the spatial relation and depending on a second relation embedding that is assigned by the second relational graph embedding to an object embedding representing the first object in the second relational graph embedding.

The method may comprise determining the second relation embedding depending on a third relation embedding that is assigned by a third relational graph embedding of the sequence of relational graph embeddings to an object embedding representing the first object in the third relational graph embedding. Thus, the first relation embedding is determined successively from two other relation embeddings. The first relation embedding comprises a history of relation embeddings that provides the basis to further improve the prediction of the position.

The method may comprise determining the set of object embeddings, wherein determining the set of object embeddings comprises determining embeddings in the first relational graph embedding that are within a predetermined distance to the first object embedding. Thus, objects that are near with respect to the spatial dimension of the digital image and near with respect to a depth of the digital image are selected for determining the relation embedding. These are the objects that are most relevant. Less relevant objects, e.g. objects that are far with respect to the depth of the digital image, are ignored. This improves the prediction of the position further.

The method may comprise selecting the first relational graph embedding and the second relational graph embedding so that the first relational graph embedding is next to the second relational graph embedding in an order of the relational graph embeddings in the sequence of the relational graph embeddings. Thus, the relational graph embedding comprises a history of two digital images that are consecutively taken. This bases the prediction of the position at a time step to a time step nearby.

The method may comprise determining an encoding of an interaction between the first object embedding and a second object embedding representing another object in the first digital image depending on the first object embedding the second object embedding and a measure for a distance between the first object embedding and the second object embedding, determining a first coefficient depending on a weighted product of the first object embedding and the second object embedding, determining the first relation embedding depending on a sum of the encoding of the interaction between the first object embedding and the second object embedding and at least one encoding of an interaction of the first object embedding with a third object embedding representing a different object than the first object and the second object, wherein the second object embedding and the third object embedding are within a predetermined spatial distance of the first object embedding, wherein the encoding of the interaction between the first object embedding and the second object embedding is weighted with the first coefficient. This way, interactions are captured as basis of the prediction.

The method may comprise determining at least a part of learnable parameters of a model based on a training on a labeled dataset, wherein the model is configured to determine the sequence of relational graph embeddings and to determine predicted positions depending on the sequence of digital images, wherein predicted positions of objects are determined with the model described above, wherein a loss function between the predicted positions and a ground truth from the labeled dataset is determined, wherein a backpropagation is run to update the learnable parameters of the model.

The method may comprise determining at least a part of learnable parameters of the regression model in the backpropagation.

In accordance with an example embodiment of the present invention, a device for object tracking comprises at least one processor and at least one memory, wherein the at least one memory comprises computer-readable instructions that, when executed by the at least one processor, cause the device to perform steps in the method.

In accordance with an example embodiment of the present invention, a non-transitory storage medium comprises computer-readable instructions that, when executed by a computer, cause the computer to perform steps in the method.

Further advantageous embodiments are derivable from the following description and the figures.

BRIEF DESCRIPTION OF THE DRAWINGS

FIG. 2 schematically depicts an architecture of a model for object tracking, in accordance with an example embodiment of the present invention.

FIG. 4 schematically depicts steps in a method for object tracking, in accordance with an example embodiment of the present invention.

DETAILED DESCRIPTION OF EXAMPLE EMBODIMENTS

Figure 1:
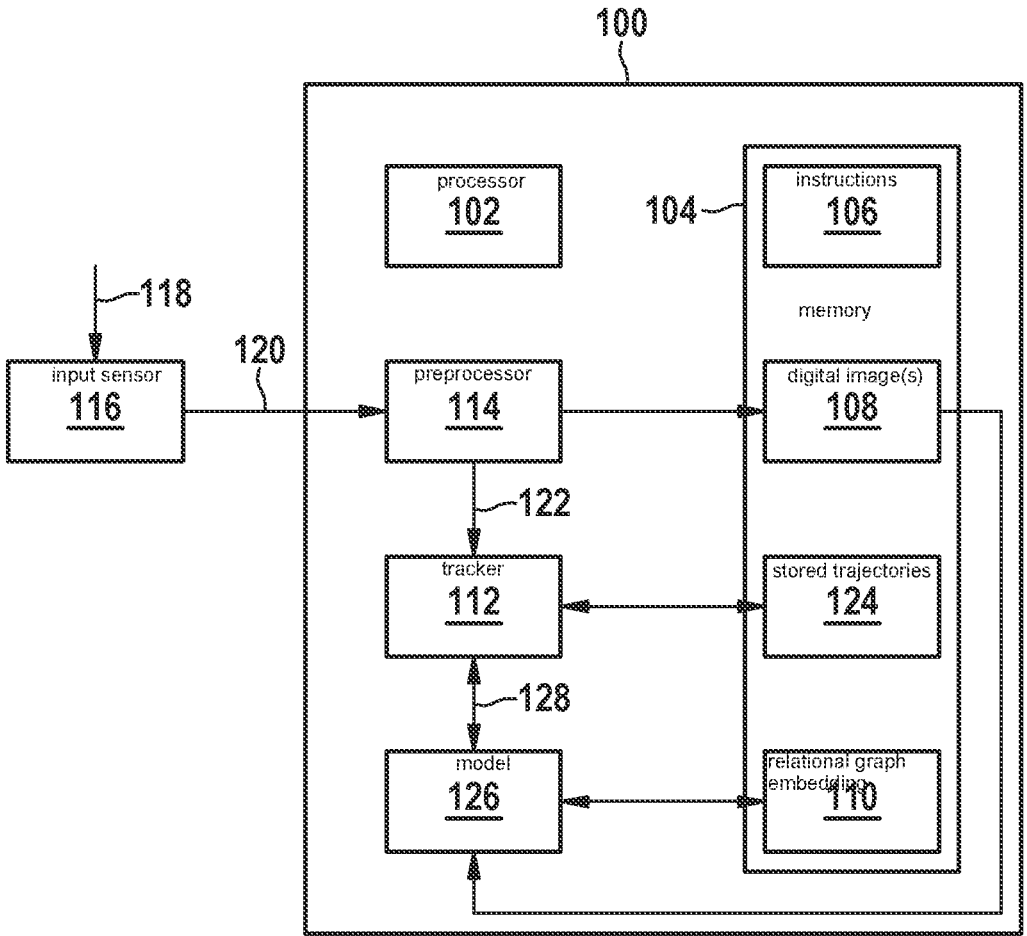
FIG. 1 schematically depicts a device for object tracking, in accordance with an example embodiment of the present invention.

FIG. 1 schematically depicts a device 100 for object tracking. The device 100 comprises at least one processor 102 and at least one memory 104.

The at least one memory 104 is configured to store computer-readable instructions 106 that, when executed by the at least one processor 102, cause the device 100 to execute steps in a method for object tracking.

The at least one memory 104 is configured to store at least one digital image 108. The at least one memory 104 is configured to store at least one relational graph embedding 110.

The device 100 in the example comprises a tracker 112 for tracking objects in digital images. The device 100 may comprise a preprocessor 114 and an input sensor 116. The input sensor 116 in the example may be a radar sensor, a lidar sensor, a camera. The input sensor 116 may be configured to scan an environment 118 of the device 100 to provide the sensor data 120.

The preprocessor 114 may be configured to create a video stream 122 from sensor data 120. The preprocessor 114 may be configured to determine the at least one digital image 108 from the video stream 122 and store it in the at least one memory 104. The tracker 112 may be configured to track objects in digital images of the video stream 122.

The tracker 112 may be configured to store trajectories 124, e.g., sequences of positions of bounding boxes for detected objects, in the at least one memory 104. The tracker 112 may configured to read stored trajectories 124 from the at least one memory 104.

The device 100 comprises a model 126 for object tracking. The model 126 is configured to determine the at least one relational graph embedding 110.

The model 126 is configured exchange information 128 about positions of object with the tracker 112.

Figure 2:
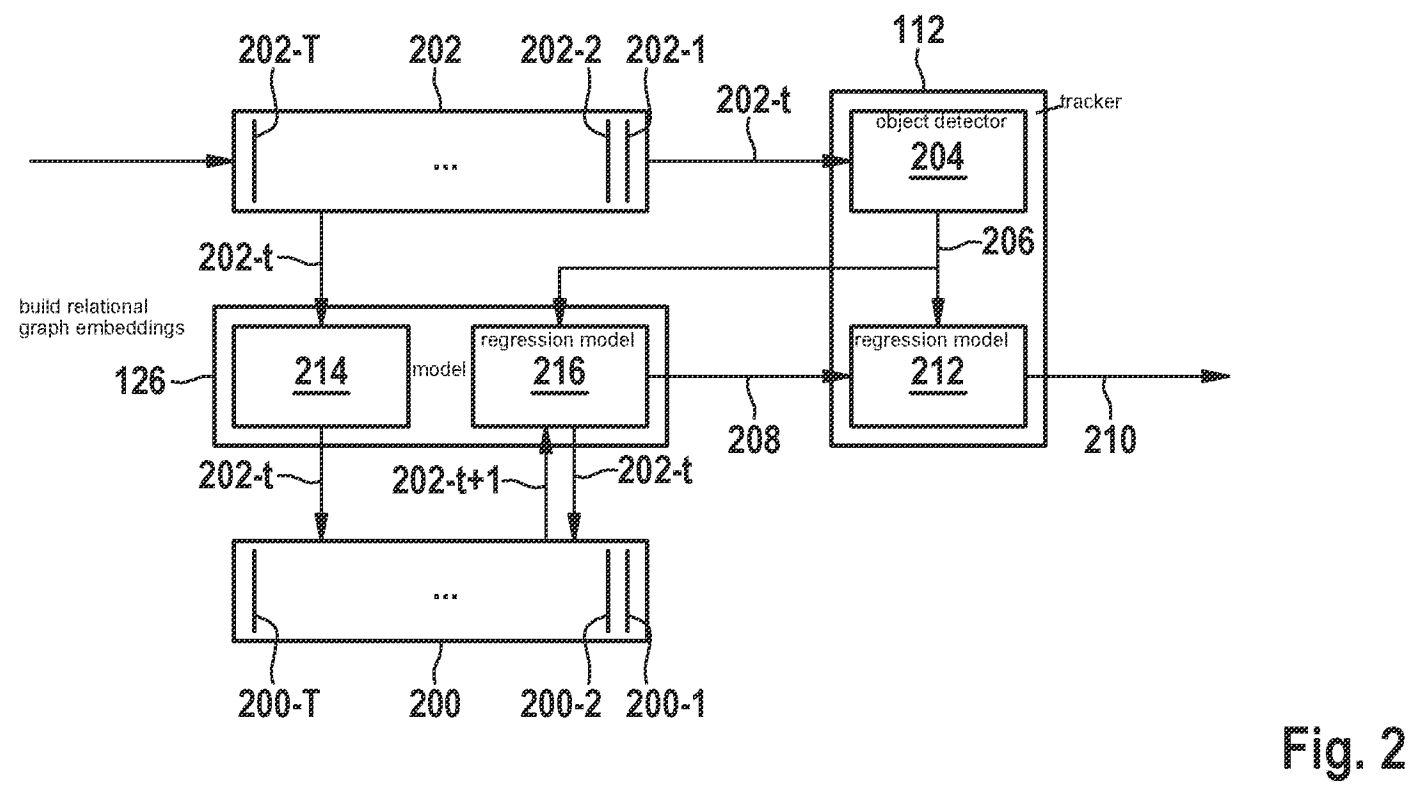

FIG. 2 schematically depicts an architecture of the model 126 for object tracking.

The model 126 is configured to determine a sequence of relational graph embeddings 200 depending on a sequence of digital images 202.

The model 126 may be configured to read the sequence of digital images 202 from the at least one memory 104.

The tracker 112 may comprise an object detector 204 that is configured for detecting objects in digital images. The object detector 204 may be configured to read the sequence of digital images 202 from the at least one memory 104.

The object detector 204 may be configured to assign bounding boxes to objects that are detected by the object detector 204.

The object detector 204 is configured to determine a proposal 206 for a position of an object in a t-th digital image 202-$t$ of the sequence of digital images 202.

The sequence of digital images 202 comprises a plurality of T digital images 202-1, . . . , 202-T.

The model 126 is configured to determine a t-th relation embedding for the object in a t-th relational graph embedding 200-$t$ that corresponds to the t-th digital image 202-$t$. The model 126 is configured to determine the t-th relation embedding depending on at least one relational embedding that is determined for another digital image. The other digital image in the example is the digital image that is next to the t-th digital image 202-$t$ in a descending order of the sequence of digital images 202. The model 126 is configured to determine a t-th relation embedding 208 for the t-th relational graph embedding 200-$t$. In the example, the model 126 is configured to determine a one-by-one mapping of digital images 202-1, . . . , 202-T to relational graph embeddings 200-1, . . . , 200-T. The model 126 is configured to determine consecutively a relational embedding of a relational graph embedding 200-$t$ depending on the relational embedding that is determined for another relational graph embedding. In the example, the other relational graph embedding is the relational graph embedding that is determined for the other digital image.

The object tracker 204 comprises an output 210 indicative of the position of the object in the t-th digital image 202-*t* or a change of the position of the object between the other digital image 202-*t* and the t-th digital image 202-*t*.

The object tracker 204 is configured to map the t-th relation embedding 208 and the proposal 206 for the t-th digital image 202-*t* to an output 210.

The object tracker 204 is configured to map the t-th relation embedding 208 and the proposal 206 with a regression model 212 to the output 210.

The model 126 is configured to map the sequence of digital images 202 to the sequence of relational graph embeddings 200 with a function 214 for building a spatial-temporal graph. The function 214 maps the t-th digital image 202-*t* to the t-th relational embedding 200-*t*.

The model 126 is configured to map the sequence of relational graph embeddings 200 to the t-th relation embedding 208 with a relation encoding module 216.

The relation encoding module 216 is configured to receive the proposal 206 as information about the position from the object detector 204 of the tracker 112.

The relation encoding module 216 maps the other relational embedding and the proposal 206 for the t-th digital image 202-*t* to the t-th relational embedding 200-*t*.

A spatial-temporal graph is defined for example as:

$$G_T = \{(V_t, E_t)_{t=1}^{T-1}; (Z_t)_t^{T-1}\}$$

where T indicates a length of the sequence of relational graph embeddings 200, $V_t$ represents vertices and $E_t$ represents edges of the graph at a time step t and $Z_t$ is a set of temporal edges from t to t+1.

For object tracking, vertices correspond to tracked objects and temporal edges encode their trajectories. In the example, vertices, which correspond to the same object, are linked in time. In the example, vertices which of different objects are disconnected in time.

To decide on spatial edges at the time step t, the function 214 determines a distance matrix $$D_{ij}^t = \sqrt{\frac{(x_i^t - x_j^t)^2}{\overline{w}_{ij}^t} - \frac{(y_i^t - y_j^t)^2}{\overline{h}_{ij}^t}}$$

where $x_i^t$, $y_i^t$ are center coordinates of a first bounding box, where $x_j^t$, $y_j^t$ are center coordinates of a second bounding box, where $w_i'$ is a width of the first bounding box, where $h_i^t$ is a height of the first bounding box, where $w_j^t$ is a width of the second bounding box, where $h_j^t$ is a height of the second bounding box, where $\overline{w}_{ij}^t = \min(w_i^t, w_j^t)$ and where $h_{ij}^t = \min(h_i^t, h_j^t)$.

The distance matrix $D_{ij}^t$ is a scaled Euclidean distance metric of pairwise distances of vertices. Other metrics may be used as well, e.g. non-scaled Euclidean distance.

The first bounding box is an indication of a position of a first object in a digital image. The second bounding box is an indication of a position of a second object in this digital image. Other indications of the positions may be used as well, e.g. estimated object positions.

The scaled Euclidean distance prevents linking vertices that represent objects that are close in the digital image regarding their center position but far away from each other with regard to the depth. An adjacency matrix A describing the relation between the vertices is obtained in the example by the function 214 with a threshold d $$A_{ij}^t = 1[D_{ij}^t \leq d]$$

where d is a hyperparameter.

Figure 3:
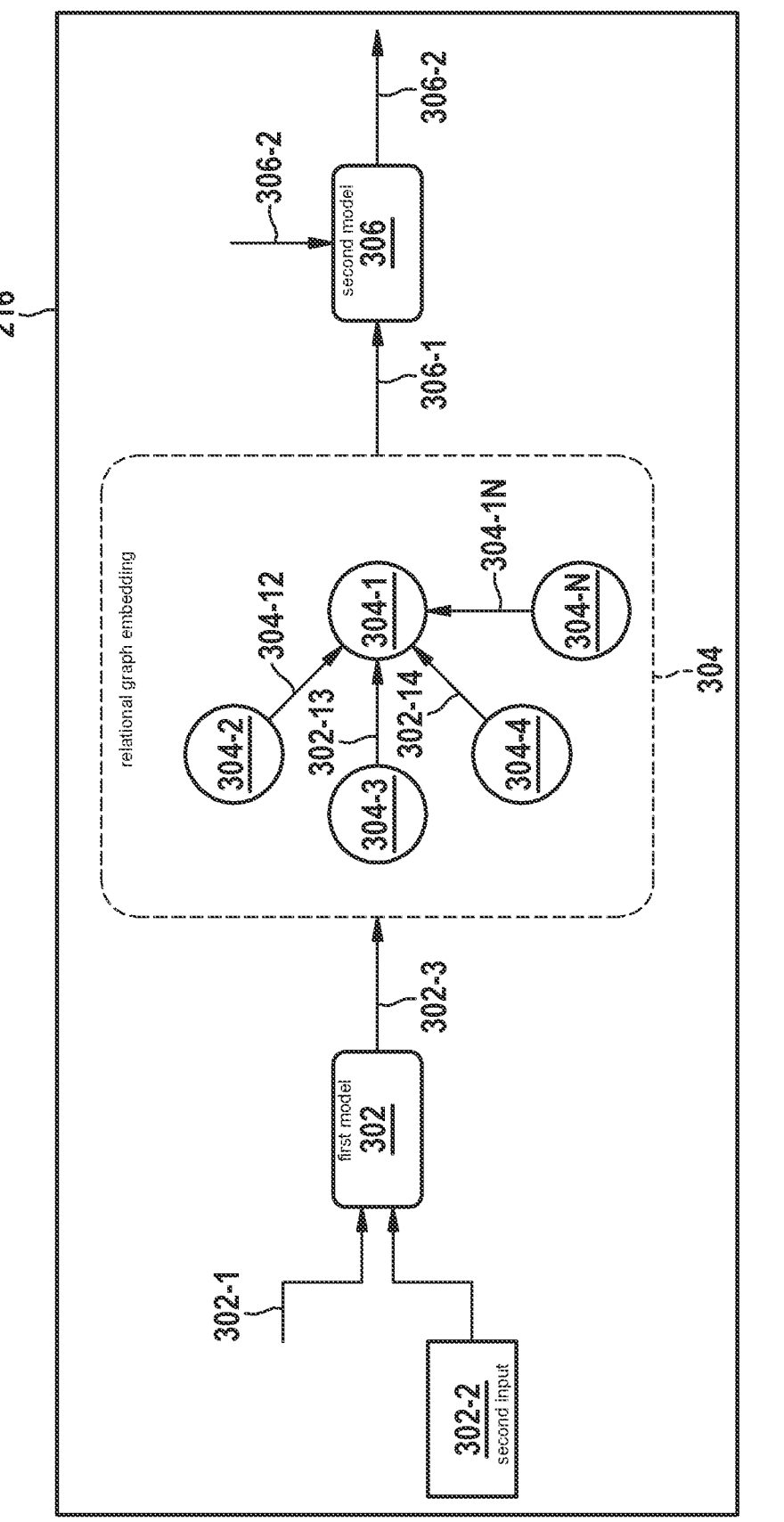
FIG. 3 schematically depicts a module of the model, in accordance with an example embodiment of the present invention.

FIG. 3 schematically depicts the relation encoding module 216.

The relation encoding module 216 comprises a first model 302 that is configured to, at the time step t, map a set of N object embeddings $\{v_i^{t-1}\}_{i=1}^N$ at a first input 302-1 of the first model 302 and a set of N embeddings $\{p_i^t\}_{i=1}^N$ of positions at a second input 302-2 of the first model 302-1 to a set of N object embeddings $\{v_i^t\}_{i=1}^N$ at an output 302-3 of the first model 302.

The set of N embeddings $\{p_i^t\}_{i=1}^N$ of positions corresponds to the proposal 206 for the t-th digital image 202-*t* at the time step t. The set of N embeddings $\{p_i^t\}_{i=1}^N$ of positions comprises positions that are detected for objects in the digital image at the time step t.

The set of N object embeddings $\{v_i^{t-1}\}_{i=1}^N$ corresponds to objects that are detected in the other digital image. In the example, the other digital image is of a previous time step t−1.

The first model 302 may comprise a neural network, e.g. a gated recurrent unit.

In the example, bounding box coordinates $p_i^t = \{x_i^t, y_i^t, w_i^t, h_i^t\}$ of an i-th object at time step t and bounding box coordinates $p_i^{t-1} = \{x_i^{t-1}, y_i^{t-1}, w_i^{t-1}, h_i^{t-1}\}$ of the i-th object at the previous time step t−1 are mapped with a non-linearity σ to an input $\tilde{p}_i^t$ for a first gated recurrent unit $GRU_{in}$, wherein the input $\tilde{p}_i^t$ and an embedding $v_i^{t-1}$ of the object at the preceding time step t−1 is mapped to an embedding $v_i^t$ for the i-th object at time t:

$$\tilde{p}_i^t = \sigma(W_{in}[p_i^t \| p_i^t - p_i^{t-1}] + b_{in})$$

$$v_i^t = GRU_{in}(\tilde{p}_i^t, v_i^{t-1})$$

wherein $W_{in}$ and $b_{in}$ are learnable parameters, and $\|$ denotes a concatenation operator. The initial hidden states of the first gated recurrent unit $GRU_{in}$ may be set to zeros.

A resulting relational graph embedding 304 comprises for a vertex $v_1$ representing a first object an embedding 304-1 representing the vertex $v_1$ and further embeddings 304-2, 304-3, 304-4, . . . , 304-N representing N vertices $v_2$, $v_3$, $v_4$, . . . , $v_N$ that represent further objects, wherein N is a number of objects for that their object embedding is within a predetermined distance of the first object embedding 304-1.

The first model 302 is configured to determine in the relational graph embedding 304 a set of N embeddings $\{\tilde{v}_i^t\}_{i=1}^N$ of a spatial relation of objects with other objects.

A message between two objects that encodes their pairwise interaction is represented by a corresponding encoding in the relation graph embedding 304.

The first model 302 is configured to determine a first encoding 304-12 of an interaction between the embedding 304-1 of the first object and the embedding 304-2 of a second object. The first model 302 is configured to determine a second encoding 304-13 of an interaction between the embedding 304-1 of the first object and the embedding 304-3 of a third object. The first model 302 is configured to determine a first encoding 304-14 of an interaction between the embedding 304-1 of the first object and the embedding 304-4 of a fourth object. The first model 302 is configured to determine further encodings of an interaction between the embedding 304-1 of the first object and the further embeddings of further objects including an N-th encoding 304-1N of an interaction between the embedding 304-1 of the first object and the embedding 304-N of the N-th object.

A message $m_{ij}^{\,t}: \mathbb{R}^F \times \mathbb{R}^F \times \mathbb{R} \to \mathbb{R}^F$ between an i-th object and a j-th object is determined in the example depending on their relative position and their distance $D_{ij}^{\,t}$ $$m_{ij}^t = \sigma(W_{m_2}(\sigma(W_{m_1}[v_i^t \| v_j^t \| D_{ij}^t] + b_{m_1})) + b_{m_2})$$

wherein $\sigma$ is a non-linearity and $W_{m_1}$, $W_{m_2}$, $b_{m_1}$, and $b_{m_2}$, are learnable parameters.

The messages of the objects are in the example aggregated in a respective coefficient:

$$\alpha_{ij}^t = \frac{\exp\left(LeakyReLU\left(\left[W_{a_1} v_i^t\right]^T \left[W_{a_2} v_j^t\right]\right)\right)}{\sum_{j \in N_i} \exp\left(LeakyReLU\left(\left[W_{a_1} v_i^t\right]^T \left[W_{a_2} v_j^t\right]\right)\right)}$$

wherein LeakyReLU is an activation function, wherein $W_{a_1}$, and $W_{a_2}$ are learnable parameters, wherein $N_i$ denotes the set of N objects for that their object embedding is within the predetermined distance to the i-th object in the spatial dimension. Temporal edges of the graph are not considered in this example.

The first model 302 is configured to an embedding $\tilde{v}_i^{\,t}$ for the i-th object depending on the aggregated messages:

$$\tilde{v}_i^t = \sigma\left(W_u\left[v_i^t \| \sum_{j \in N_i} \alpha_{ij}^t m_{ij}^t\right] + b_u\right)$$

wherein $W_u$ and $b_u$ are learnable parameters.

The relation encoding module 216 comprises a second model 306 that is configured to, at the time step t, map the set of N embeddings $\{\tilde{v}_i^{\,t}\}_{i=1}^N$ of the spatial relations for that time step t at a first input 306-1 of the second model 306 and a relation embedding $\{r_i^{t-1}\}_{i=1}^N$ for the previous time step t−1 for the set of N objects at a second input 306-2 of the second model 306 to a set of N relation embeddings $\{r_i^t\}_{i=1}^N$ at an output 306-3 of the second model 306.

The second model 306 may comprise neural network, e.g. a gated recurrent unit.

In the example, the set of N embeddings $\{\tilde{v}_i^{\,t}\}_{i=1}^N$ of the relational graph embedding 304 for the time step t and the set of N relation embeddings $\{r_i^{t-1}\}_{i=1}^N$ for the previous time step t−1 is mapped with a second gated recurrent unit $GRU_{rel}$. A relation embedding $r_i^t$ for the embedding $\tilde{v}_i^{\,t}$ for the i-th object is for example $$r_i^t = GRU_{rel}(\tilde{v}_i^t, r_i^{t-1})$$

The initial hidden states of the second gated recurrent unit $GRU_{rel}$ may be set to zeros.

In the example, the relational embeddings $r_i^t$ at time step t=0 are set to zero vectors.

In the example, the temporal updates follow the spatial updates. The temporal update may be performed first followed by the spatial update.

A relation importance $R_{ij}^{\,t}: \mathbb{R}^F \times \mathbb{R}^F \to \mathbb{R}_+$ may be produced by the relational encoding module 216:

$$R_{ij}^t = \mathbb{1}[D_{ij}^t \leq d]\phi(r_i^t, r_{i\emptyset j}^t)$$

where $\phi$ is a bounded metric, and $r_{i\emptyset j}^t$ denotes the relation encoding of the i-th object computed by excluding the j-th node from the set of N objects for that their object embedding is within the predetermined distance to the i-th object in the spatial dimension. In an example, $\phi(x,y)=1-cosine^2$ (x,y) may be used. A higher $R_{ij}^{\,t}$ indicates a higher degree of relation between objects i,j. The relation importance may be determined depending on the coefficients $\alpha_{ij}^{\,t}$.

In the example, the tracker 112 is made aware of relations and conditions the predicted positions of objects on their relation embeddings. This allows the tracker 112 to jointly reason about groups of the objects and provides better identity preservation as an object can now be recognized based on how it relates to the neighbors. To do so, appearance features extracted from proposal regions are concatenated with the relation embeddings of the corresponding objects to combined features. The positional offset, i.e. the change of the position, is then predicted by passing the combined features via a regression head of a backbone object detector. The regression head in the example corresponds to the regression model 212.

The relation embeddings are calculated by the relation encoding module 216 on top of trajectories that are produced by the tracker 112.

The model 126 may comprise one relation encoding module 216 for any object that is tracked by the tracker 112.

The relation features in the example are computed directly from the positions and do not rely on an appearance of the object. Thus, the relation embedding of an object can be used to estimate its position. For this, the relation embedding of an object of interest is input to e.g. a multilayer perceptron, MLP, which predicts the positional offset, i.e. the change of the position. The predicted offset may be used, e.g. added as offset, to the previous position of the object to predict the new position. The new position may be utilized for the next iteration of the relation encoding.

FIG. 4 depicts a flow chart with steps of a method for object tracking. The method iterates through the sequence of digital images 202, in iteration t starting with the T-th digital image 202-T. T and threshold d are hyper-parameters, that are set. The sequence of digital images 202 of length T may be sampled from a longer sequence of digital images.

The method comprises a step 400.

In the step 400, the t-th digital image 202-t is selected from the series of digital images.

Afterwards, a step 402 is executed.

In the step 402 the positions $\{p_i^t\}_{i=1}^N$ of N objects in the t-th digital image 200-t are provided as proposal 206. The positions of the objects may be determined by the tracker 112. The tracker 112 may track objects that are detected by an object detector.

In the example, the positions $\{p_i^t\}_{i=1}^N$ of N objects that are within the predetermined distance of each other are provided. In the example, the distances $D_{ij}^{\,t}$ are determined and the objects having a distance $D_{ij}^{\,t}$ that is smaller than or equal to the threshold d are selected.

Afterwards a step 404 is executed.

In the step 404 a t-th relational graph embedding 200-t is determined.

Determining the t-th relational graph embedding 200-t comprises a step 404-1 of determining embeddings of spatial relations for the N objects. In the example, the N embeddings of spatial relations are determined for the N objects that are within the predetermined distance to each other.

Afterwards, a step 406 is executed.

In the step 406 the t-th relation embeddings 208 are determined. In the example, the N relation embeddings $\{r_i^{t-1}\}_{i=1}^N$ are determined for the N objects that are within the predetermined distance to each other. In a first iteration t=1, the relation embeddings may be initialized with zeros.

Determining the t-th relation embeddings 208 comprises a step 406-1 of determining the encodings $m_{ij}^{\,t}$ of interactions for objects. In the example, the encodings $m_{ij}^t$ are determined for the N objects that are within the predetermined distance to each other.

Determining the t-th relation embeddings 208 comprises a step 406-2 of determining the coefficients $\alpha_{ij}^t$ for the encodings of interactions. In the example, the coefficients $\alpha_{ij}^t$ are determined for the N objects that are within the predetermined distance to each other.

Determining the t-th relation embeddings 208 comprises a step 406-3 of determining the relation embeddings $\{r_i^{t-1}\}_{i=1}^N$ depending on sums of the respective encodings $m_{ij}^t$ weighted by the respective coefficients $\alpha_{ij}^t$.

In the example, the t-th relation embeddings 208 are determined for a pair of relational graph embeddings of the sequence of relational graph embeddings 200. The relational graph embeddings of the pair are selected in the example so that they are next to each other. The t-th relation embeddings are in the example determined based on the relation embeddings of the previous time step t−1.

Afterwards a step 408 is executed.

In the step 408 the t-th relation embeddings 208 and the proposal 206 for the positions from the tracker 112 for the t-th first digital image 202-*t* are mapped with the regression model 212 to the output 210.

Afterwards, a step 410 is executed.

In the step 410 the predicted positions of the objects in the t-th digital image 202-*t* is determined depending on the position of the object in the digital image of the previous time step t−1 and the output 210.

The method may comprise an optional step 412. In the optional step 412, trajectories 120 are extended for the objects with the predicted positions.

The method may comprise an optional step 414. In the optional step 412, a control signal is determined based on the predicted positions or based on the trajectories 120.

The predicted positions may relate to vehicles or pedestrians that are tracked for surveillance or autonomous driving.

The control signal may change an operation of a technical system, e.g. a robot, a machine or a vehicle, e.g. to avoid moving towards a predicted position of an object or to avoid crossing a trajectory of an object, or to move the input sensor 116 to follow a tracked object.

Afterwards, the step 400 is executed.

The method continues with step 400 in the example, until the T relational graph embeddings 200-T, . . . , 200-1 are processed.

Preferably, the digital images 202-T, . . . , 202-1 and or the relational graph embeddings 200-T, . . . , 200-1 are processed in the order in that the digital images 202-T, . . . , 202-1 were taken. The method may comprise skipping digital images or relational graph embeddings or processing every n-th digital image or relational graph embedding, where n is an integer indicating the index in the order of the respective sequence.

Figure 5:
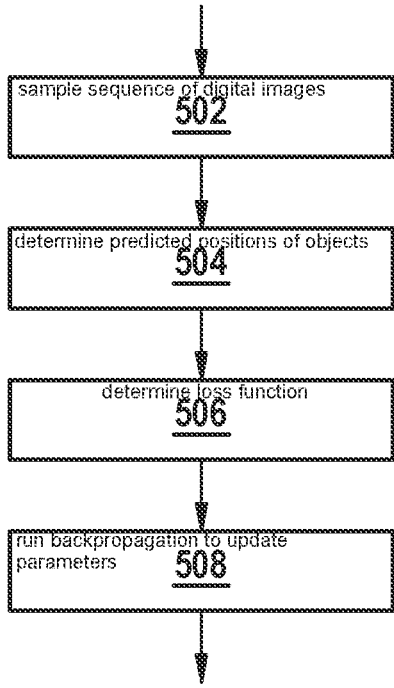
FIG. 5 schematically depicts steps in a method for training the model, in accordance with an example embodiment of the present invention.

A method of training the model 126 is described with reference to FIG. 5.

The method of training comprises optimizing the learnable parameters of the model 126. The method of training may comprise optimizing parameters of the tracker 112. The method of training is based on a training on a labeled dataset.

The method comprises a step 502.

In the step 502, the sequence of digital images 202 is sampled.

Afterwards, a step 504 is executed.

In the step 504, predicted positions of object are determined with the model 126. The predicted positions are determined in the example according to the steps 400 to 410.

10

Afterwards, a step 506 is executed.

In the step 506, a loss function between the predicted positions and a ground truth from the labeled dataset is determined.

Afterwards, a step 508 is executed.

In the step 508, a backpropagation is run to update the learnable parameters of the model 126. The parameters of the tracker 112 may be learned as well with the backpropagation.

What is claimed is:

1. A computer-implemented method of a vehicle that includes a sensor system having one or more sensors and a processor system that includes at least one processor, the method comprising the following steps:
   using, by the vehicle, the sensor system to obtain sensor data while the vehicle is traveling in an environment;
   processing, by the processor system, the sensor data to obtain a sequence of digital images of the environment;
   determining a sequence of relational graph embeddings in the obtained sequence of digital images, wherein a first relational graph embedding of the sequence includes:
      a first object embedding representing a first object of the environment represented in a first digital image of the sequence of digital images, and
      a first relation embedding of a relation for the first object embedding, wherein the first relation embedding relates the first object embedding to embeddings representing other objects of the environment represented in the first digital image in the first relational graph embedding and to embeddings in a second relational graph embedding of the sequence that represent objects of the environment represented in a second digital image of the sequence of digital images;
   based on the determined sequence, inferring, by the processor system, a behavior of one or more of the first and other objects in the environment of the vehicle; and
   adapting, by the processor system, an autonomous driving behavior of the vehicle based on the inferred behavior.

2. The method according to claim 1, wherein the inferred behavior includes a predicted position of the first object, and the inference is made by mapping the first relational graph embedding and a position of the first object in the second digital image with a regression model to an output indicative of the predicted position of the first object in the first digital image or a change of the position for the predicted position of the first object in the first digital image.

3. The method according to claim 2, wherein the inferring of the behavior further comprises providing the position of the first object in the second digital image, the predicted position of the first object in the first digital image depending on the position of the first object in the second digital image and the output indicative of the change of the position.

4. The method according to claim 2, wherein:
   the inferring of the predicted position includes reading a first trajectory for the first object from the at least one memory and determining the predicted position of the first object depending on the first trajectory; and
   the inferring of the behavior further includes determining a second trajectory depending on the predicted position of the first object.

5. The method according to claim 1, wherein the determining of the first relation embedding includes:
   determining an embedding of a spatial relation for the first object embedding, the spatial relation relating the first object embedding to a set of object embeddings representing other objects of the first digital image in the first relational graph embedding, and determining the first relation embedding depending on the spatial relation and depending on a second relation embedding that is assigned by the second relational graph embedding to an object embedding representing the first object in the second relational graph embedding.

6. The method according to claim 5, further comprising:
determining the second relation embedding depending on a third relation embedding that is assigned by a third relational graph embedding of the sequence of relational graph embeddings to an object embedding representing the first object in the third relational graph embedding.

7. The method according to claim 5, further comprising:
determining the set of object embeddings, wherein the determining of the set of object embeddings includes determining embeddings in the first relational graph embedding that are within a predetermined distance to the first object embedding.

8. The method according to claim 1, further comprising:
selecting the first relational graph embedding and the second relational graph embedding so that the first relational graph embedding is next to the second relational graph embedding in an order of the relational graph embeddings in the sequence of the relational graph embeddings.

9. The method according to claim 1, further comprising:
determining an encoding of an interaction between the first object embedding and a second object embedding representing another object in the first digital image depending on the first object embedding the second object embedding and a measure for a distance between the first object embedding and the second object embedding;

determining a first coefficient depending on a weighted product of the first object embedding and the second object embedding; and determining the first relation embedding depending on a sum of the encoding of the interaction between the first object embedding and the second object embedding and at least one encoding of an interaction of the first object embedding with a third object embedding representing a different object than the first object and the second object, wherein the second object embedding and the third object embedding are within a predetermined spatial distance of the first object embedding, wherein the encoding of the interaction between the first object embedding and the second object embedding is weighted with the first coefficient.

10. The method according to claim 1, further comprising the following steps:
determining at least a part of learnable parameters of a model based on a training on a labeled dataset, wherein the model is configured to determine a sequence of relational graph embeddings and to determine predicted positions depending on a sequence of digital images, wherein each predictive position of the predicted positions of objects is determined with the model by (I) the performance of steps (a) and (b) and (II) performance of a step of the mapping the first relational graph embedding and a position of the first object in the second digital image with a regression model to an output indicative of a predicted position of the first object in the first digital image or a change of the position for a predicted position of the first object in the first digital image;

determining a loss function between the predicted positions and a ground truth from the labeled dataset is determined; and running a backpropagation to update the learnable parameters of the model.

11. The method according to claim 10, further comprising:
determining at least a part of learnable parameters of the regression model in the backpropagation.

12. A vehicle comprising:
a sensor system that includes one or more sensors;
a processor system that includes at least one processor; and
at least one memory, wherein the at least one memory includes computer-readable instructions that are executable by the processor system and that, when executed by the processor system, cause the processor system to perform the following steps:
using the sensor system to obtain sensor data while the vehicle is traveling in an environment;
processing the sensor data to obtain a sequence of digital images of the environment;
determining a sequence of relational graph embeddings in the obtained sequence of digital images, wherein a first relational graph embedding of the sequence includes:
a first object embedding representing a first object of the environment represented in a first digital image of the sequence of digital images, and
a first relation embedding of a relation for the first object embedding, wherein the first relation embedding relates the first object embedding to embeddings representing other objects of the environment represented in the first digital image in the first relational graph embedding and to embeddings in a second relational graph embedding of the sequence that represent objects of the environment represented in a second digital image of the sequence of digital images;
based on the determined sequence, inferring a behavior of one or more of the first and other objects in the environment of the vehicle; and
adapting an autonomous driving behavior of the vehicle based on the inferred behavior.

13. A non-transitory storage medium on which is stored computer-readable instructions that are executable by a processor system of a vehicle, the vehicle further including a sensor system having one or more sensors, the processor system including at least one processor, wherein the instructions, when executed by the processing system, cause the processor system to perform the following steps:
using, by the vehicle, the sensor system to obtain sensor data while the vehicle is traveling in an environment;
processing, by the processor system, the sensor data to obtain a sequence of digital images of the environment;
determining a sequence of relational graph embeddings in the obtained sequence of digital images, wherein a first relational graph embedding of the sequence includes:
a first object embedding representing a first object of the environment represented in a first digital image of the sequence of digital images, and
a first relation embedding of a relation for the first object embedding, wherein the first relation embedding relates the first object embedding to embeddings representing other objects of the environment represented in the first digital image in the first relational graph embedding and to embeddings in a second relational graph embedding of the sequence that represent objects of the environment represented in a second digital image of the sequence of digital images;

based on the determined sequence, inferring, by the processor system, a behavior of one or more of the first and other objects in the environment of the vehicle; and adapting, by the processor system, an autonomous driving behavior of the vehicle based on the inferred behavior.

14. The method according to claim 1, wherein:

the using of the sensor system to obtain the sensor data includes using, by the processor system, the sensor system to scan the environment, which is a surrounding environment of the vehicle, thereby capturing data about the objects, which are in the surrounding environment;

the processing of the sensor data to obtain the sequence of digital images of the environment includes generating, by the processor system and from the sensor data, a video stream formed of the sequence of digital images;

the determining of the sequence of relational graph embeddings includes performing the following iteratively for different respective ones of the digital images of the sequence:

identifying, by the processor system, the objects in the respective digital image;

assigning, by the processor system, bounding boxes for bounding the identified objects;

generating, by the processing system, proposed positions of the bounded objects;

determining, by the processor system, embeddings of spatial relations for the objects;

determining, by the processor system, encodings of interactions for the objects;

determining, by the processor system, respective coefficients for respective ones of the encodings;

determining, by the processor system, the relation embeddings based on the embeddings of spatial relations and on sums of the encodings weighted by the respective coefficients; and determining, by the processor system, a respective one of the relational graph embeddings corresponding to the respective digital image based on relationships between the objects as reflected by the relation embeddings;

the inferring of the behavior of the one or more of the first and other objects includes using, by the processor system, a regression model that maps the relational graph embeddings and the proposed positions to predict future positions of the objects;

the adapting is performed based on the predicted future positions; and the vehicle continuously monitors the surrounding environment for updating the relational graph embeddings and the predicted future positions of the objects, for further adaptations of the autonomous driving behavior.

15. The method as recited in claim 10, wherein the determining of each of the relational graph embeddings is further based on historical trajectories of the objects.

* * * * *